(12) United States Patent
Takenaka

(10) Patent No.: US 6,896,080 B2
(45) Date of Patent: May 24, 2005

(54) DRIVING APPARATUS HAVING A SHAFT SUPPORT STRUCTURE

(75) Inventor: Masayuki Takenaka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 27 days.

(21) Appl. No.: 09/879,129

(22) Filed: Jun. 13, 2001

(65) Prior Publication Data

US 2001/0050190 A1 Dec. 13, 2001

(30) Foreign Application Priority Data

Jun. 13, 2000  (JP) .................................. 2000-177532

(51) Int. Cl.[7] ................................................ B60K 6/02
(52) U.S. Cl. ...................... 180/65.2; 180/65.6; 475/5
(58) Field of Search .............................. 180/65.2, 65.1, 180/65.3, 65.4, 65.6; 475/5; 74/458

(56) References Cited

U.S. PATENT DOCUMENTS

| | | | | |
|---|---|---|---|---|
| 2,982,221 A | * | 5/1961 | Whitfield ...................... | 74/458 |
| 4,594,914 A | | 6/1986 | Kubo et al. | |
| 4,656,884 A | * | 4/1987 | Nemoto ........................ | 74/458 |
| 5,055,092 A | * | 10/1991 | Langenberg et al. ............ | 475/2 |
| 5,558,595 A | | 9/1996 | Schmidt et al. | |
| 5,643,119 A | | 7/1997 | Yamaguchi et al. | |
| 5,674,063 A | * | 10/1997 | Ozaki et al. .............. | 418/201.3 |
| 5,876,300 A | | 3/1999 | Moroto et al. | |
| 6,155,364 A | * | 12/2000 | Nagano et al. ............ | 180/65.2 |
| 6,260,644 B1 | * | 7/2001 | Otsu .......................... | 180/65.3 |
| 6,334,364 B1 | * | 1/2002 | Suzuki ...................... | 180/65.8 |
| 6,402,654 B1 | * | 6/2002 | Lanzon et al. .............. | 475/204 |
| 6,558,283 B1 | * | 5/2003 | Schnelle ........................ | 475/5 |

FOREIGN PATENT DOCUMENTS

| | | |
|---|---|---|
| FR | 2 774 039 | 7/1999 |
| JP | 10175455 A | 6/1998 |

\* cited by examiner

Primary Examiner—Christopher P. Ellis
Assistant Examiner—Jeff Restifo
(74) Attorney, Agent, or Firm—Oliff & Berridge, PLC

(57) ABSTRACT

A driving apparatus having a shaft structure that reduces a load on shaft supports and enhances durability of the motor. The driving apparatus includes an electric motor, an electric motor shaft, first and second shaft supports, a counter drive gear on the electric motor shaft, and a counter driven gear to be meshed with the counter drive gear. Output of the electric motor is transmitted to wheels through both of the gears. The counter drive gear is disposed at a position closer to one of the shaft supports, a helix angle is set in a direction in which a thrust force S acts toward the second shaft support, which is farther from the gear. With this arrangement, a load caused by a radial force applied to the first shaft support, which is closer to the counter drive gear, is reduced.

21 Claims, 14 Drawing Sheets

DRIVING APPARATUS HAVING A SHAFT SUPPORT STRUCTURE

BACKGROUND OF THE INVENTION

1. Field of Invention

The invention relates to a driving apparatus using an electric motor as a power source, and more particularly, to a shaft support structure in a driving apparatus.

2. Description of Related Art

In the case of an electric motor in an electric vehicle driving apparatus using an electric motor as a driving source or in a hybrid driving apparatus and the like (hereinafter generally called a driving apparatus) in which an engine (combustion engine) and an electric motor are used in combination, the motor is required to be smaller in size in view of energy-saving and space-saving. In view of this requirement, for example, Japanese Patent Application Laid-open No. H10-175455 discloses a technique for downsizing an electric motor of a driving apparatus in which a gear ratio of a power transmission system to the wheels is increased using a speed-reduction mechanism such as a counter gear, thereby increasing driving torque by the gear ratio.

When the gear ratio of the driving apparatus is increased as in the prior art, it is necessary to rotate the electric motor at high speed to meet the speed reduction ratio, and there is a problem that a drag loss of a bearing as shaft support means which supports a counter drive gear on an electric motor shaft is increased or the durability of the bearing is lowered due to the high speed rotation. In the driving apparatus of the prior art, no special consideration is given to the increase in bearing load. When the life of the bearing is shortened or a ball bearing having small drag loss is used, the bearing must be greatly increased in size to sufficiently enhance its durability.

SUMMARY OF THE INVENTION

An object of the invention is to reduce a load applied to a shaft support means through a support shaft of a gear by distributing a radial load and a thrust load applied to gears constituting a speed-reduction mechanism, thereby preventing an increase in drag loss of the shaft support means as the size of the electric motor is reduced and its speed of rotation is increased. Such an arrangement ensures durability of the shaft support means without a concomitant increase in the size thereof.

To achieve the above object, the invention provides a driving apparatus comprising an electric motor, an electric motor shaft connected to the electric motor and supported by first and second shaft support means, a first counter drive gear comprising a helical gear provided on the electric motor shaft between the first and second shaft support means, and a first counter driven gear to be meshed with the first counter drive gear, in which an output of the electric motor is transmitted to wheels through the first counter drive gear and the first counter driven gear, wherein the first counter drive gear is disposed at a position closer to one of the first and second shaft support means, and a helix angle of the first counter drive gear is set in a direction in which a thrust force is applied toward the other shaft support means.

Further, the invention provides a driving apparatus comprising an electric motor, an electric motor shaft connected to the electric motor and supported by first and second shaft support means, a first counter drive gear comprising a helical gear provided on the electric motor shaft between the first and second shaft support means, and a first counter driven gear to be meshed with the first counter drive gear, in which an output of the electric motor is transmitted to wheels through the first counter drive gear and the first counter driven gear, wherein the first counter drive gear is disposed at a position closer to one of the first and second shaft support means, and a helix angle of the first counter drive gear is set in a direction in which a reaction force of moment load caused by a thrust force in the shaft support means and a reaction force of a radial force cancel each other.

The above structure is effective when a position of the first counter drive gear between the first and second shaft support means is set such that a resultant of the reaction force of radial force and reaction force of moment load by the thrust force applied to the first shaft support means is equal to a resultant of the reaction force of radial force and reaction force of moment load by the thrust force applied to the second shaft support means.

The above structure is more effective when the driving apparatus is mounted in a vehicle, and a relationship between the helix angle and a direction in which the thrust force acts is set for when the vehicle is in a power running state.

The above structure is effective when the driving apparatus further comprises an engine, an output shaft drivably connected to the engine and supported by third and fourth shaft support means, a second counter drive gear comprising a helical gear provided on the output shaft at an outer side with respect to the third and fourth shaft support means, a second counter driven gear to be meshed with the second counter drive gear, a system for transmitting output of the engine to the wheels through the second counter drive gear and the second counter driven gear and a helix angle of the second counter drive gear set in a direction in which a thrust force is applied toward the third and fourth shaft support means.

The above structure is effective when the driving apparatus further comprises an engine, an output shaft drivably connected to the engine, opposite ends of the output shaft being supported by third and fourth shaft support means, a second counter drive gear comprising a helical gear provided on the output shaft between the third and fourth shaft support means, a second counter driven gear to be meshed with the second counter drive gear, and a system for transmitting output of the engine to the wheels through the second counter drive gear and the second counter driven gear, wherein the second counter drive gear is disposed at a position closer to one of the third and fourth shaft support means, and a helix angle of the second counter drive gear is set in a direction in which a thrust force is applied toward the other of the third and fourth shaft support means.

The above structure is effective when a position of the second counter drive gear is set such that a resultant of the reaction force of radial force and reaction force of moment load by the thrust force applied to the third shaft support means is equal to a resultant of the reaction force of radial force and reaction force of moment load by the thrust force applied to the fourth shaft support means.

The above structure is effective when the driving apparatus is mounted in a vehicle, and a relationship between the helix angle and a direction in which the thrust force acts is set for when the vehicle is in a power running state.

The above structure is effective that when the driving apparatus further comprises a planetary gear set which is disposed between the engine and the second counter drive gear in power transmission and comprises a combination of helical gears, one element of the planetary gear set rotating integrally with the output shaft, wherein helix angles of the one element of the planetary gear set and the second counter drive gear are set in a direction to cancel thrust forces with each other.

In the above structure, the first counter driven gear and second counter driven gear may be the same member.

According to a first aspect of the invention, the reaction force of the radial force received by one of the shaft support means is greater than that of the other shaft support means due to the position of the first counter drive gear between both of the shaft support means with respect to the radial force generated in the first counter drive gear by meshing with the first counter driven gear. Further, because the thrust force acts on the other side of the shaft support means, the reaction force of moment load caused by the same amount of thrust force is applied to the shaft support means in a direction opposed to the radial force and to the other shaft support means in a direction of the radial force. Therefore, the shaft support means receives a large reaction force of radial force and the reaction force of moment load caused by the thrust force is applied in a direction opposed to the shaft support means. Thus, it is possible to reduce the load to the shaft support means and to enhance the durability thereof. With this arrangement, the electric motor shaft can rotate at high speed, and the electric motor can be reduced in size.

According to a second aspect of the invention, the reaction force of the radial force received by one of the shaft support means is greater than that of the other shaft support means due to the position of the first counter drive gear between both of the shaft support means with respect to the radial force generated in the first counter drive gear by meshing with the first counter driven gear. Further, because the thrust force acts on the other side, the same reaction force of moment load caused by the thrust force is applied to the shaft support means in a direction canceling the radial force and to the other shaft support means in an assisting direction. Therefore, the shaft support means receives a large reaction force of radial force and the reaction force of moment load caused by the thrust force is applied in a direction canceling the reaction force of radial force. Thus, it is possible to reduce the load to the shaft support means and to enhance the durability thereof. With this arrangement, the electric motor shaft can rotate at high speed, and the electric motor can be reduced in size.

According to a third aspect of the invention, loads applied to both of the shaft support means can be made uniform, inclination of the electric motor shaft is eliminated, the load can be reduced not only in the shaft support means but also in the other shaft support means, and durability thereof can be enhanced.

According to a fourth aspect of the invention, during driving of the vehicle, torque transmission of the counter drive gear during the power running (driving of wheels in a power transmitting state in which the counter drive gear functions as a driving gear) is greater than that during the regenerative running (reverse driving from wheels in which the counter drive gear functions as a follower gear), and with this, the load setting serves to reduce load for satisfying characteristics with which a large load is to be applied to the shaft support means. This is advantageous to the shaft support means as, compared with a load reduction setting in accordance with the reverse driving state (regenerative running), the load over the entire running time of the vehicle is reduced and the durability of the shaft support means is further enhanced.

According to a fifth aspect of the invention, the reaction force of moment load caused by the thrust force can act in a direction to cancel the reaction force of radial force of the second counter drive gear in the third and fourth shaft support means by meshing with the second counter driven gear. Therefore, loads to both of the shaft support means that support the output shaft can be reduced, and durability of the shaft support means thereof can be enhanced.

According to a sixth aspect of the invention, the reaction force of the radial force received by one of the shaft support means is greater than that of the other shaft support means due to the position of the second counter drive gear between both of the shaft support means with respect to the radial force generated in the second counter drive gear by meshing with the second counter driven gear. Further, as the thrust force is applied to the other side of the shaft support means, the same reaction force of moment load caused by the thrust force is applied to the shaft support means in a direction canceling the radial force and to the other shaft support means in a direction that adds to the radial force. Therefore, the shaft support means receives a large reaction force of radial force and the reaction force of moment load caused by the thrust force is applied in a direction canceling the reaction force of radial force. Thus, it is possible to reduce the load to the shaft support means and to enhance the durability thereof.

According to a seventh aspect of the invention, loads applied to the third and fourth shaft support means can be made uniform, inclination of the electric motor shaft is eliminated and, in the first to fourth shaft support means, the load can be reduced not only in one of the shaft support means but also in the other shaft support means, and durability thereof can be enhanced.

According to an eighth aspect of the invention, during driving of the vehicle, torque transmission of the counter drive gear during the power running (driving of wheels in a power transmitting state in which the counter drive gear functions as a driving gear) is greater than that during the regenerative running (reverse driving from wheels in which the counter drive gear functions as a follower gear), and with this, the load setting serves to reduce load for satisfying characteristics with which a large load is to be applied to the first through the fourth shaft support means. This is advantageous to the first through the fourth shaft support means as, compared with a load reduction setting in accordance with the reverse driving state (regenerative running), the load over the entire running time of the vehicle is reduced, and the durability of not only the first and second shaft support means but also the third and fourth shaft support means is enhanced.

According to a ninth aspect of the invention, when the planetary gear set is disposed on a side of the output shaft, a thrust force applied to one element of the planetary gear set and a thrust force applied to the second counter drive gear cancel with each other so that the loads to the third and fourth shaft support means are further reduced, and durability of the shaft support means is further enhanced.

According to a tenth aspect of the invention, because the same counter driven gear is meshed with the first and second counter drive gears, the electric motor can be reduced in size and, thus, the driving apparatus can further be reduced in size.

BRIEF DESCRIPTION OF THE DRAWINGS

The invention will be described with reference to the figures in which.

DETAILED DESCRIPTION OF PREFERRED EMBODIMENTS

Figure 1:
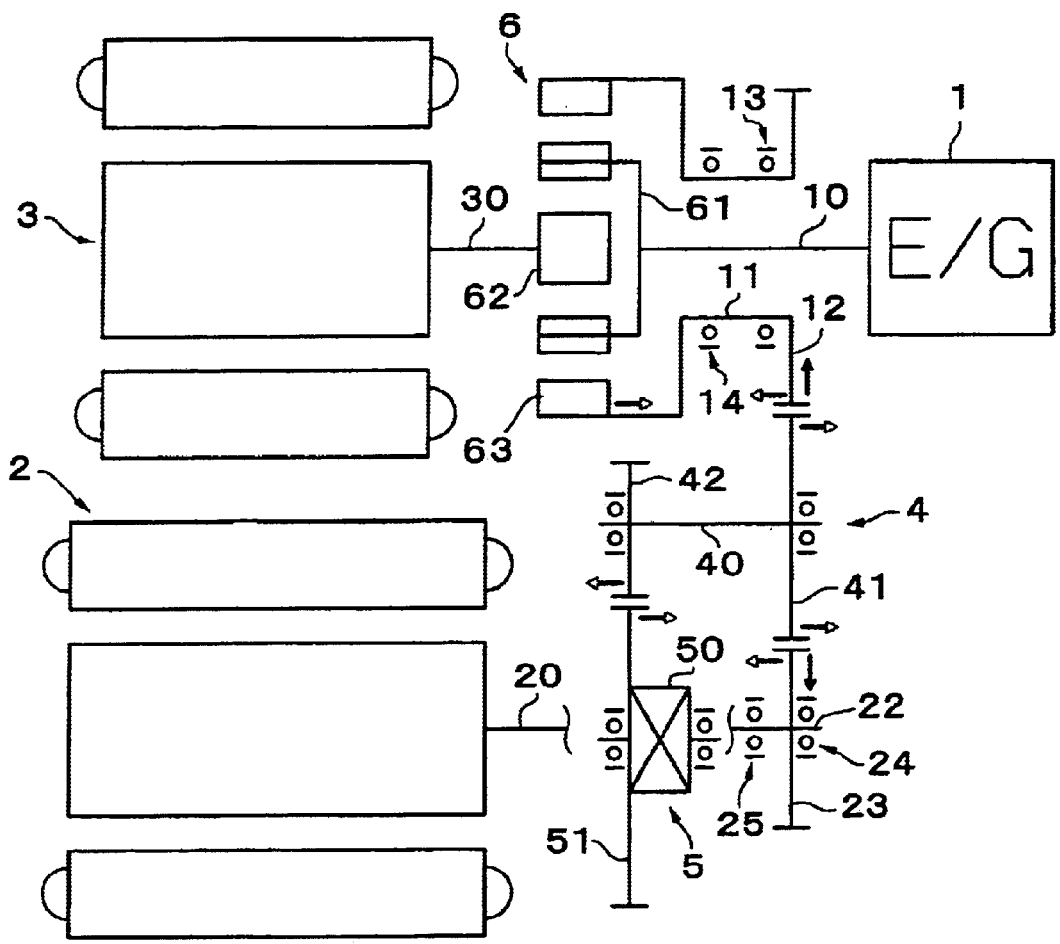
FIG. 1 is a skeleton diagram of a hybrid driving apparatus according to a first embodiment of the invention.

Hereinafter, embodiments of the invention will be explained with reference to the drawings. First, FIG. 1 is a skeleton diagram showing a developed portion between shafts of a hybrid driving apparatus of the first embodiment to which the invention is applied. The driving apparatus mainly comprises an engine 1, an electric motor (motor, hereinafter) 2, a power generator (generator, hereinafter) 3 and a differential device 5. A planetary gear set 6 having a single pinion constituting a differential gear apparatus and a counter gear mechanism 4 are interposed between the above elements.

In this driving apparatus, the engine 1, the generator 3 and the planetary gear set 6 are disposed on output shaft axes that extend parallel to each other, the motor 2 is disposed on a motor axis, the counter gear mechanism 4 is disposed on a counter axis, and the differential device 5 is disposed on a differential device axis. These axes are in parallel to each other. The engine 1 and the generator 3 are drivably connected to the counter gear mechanism 4 through the planetary gear set 6. The motor 2 and the differential device 5 are drivably connected to the counter gear mechanism 4 directly.

The output shaft 10 of the engine 1 connects to a carrier 61 of the planetary gear set 6. The engine 1 is thus drivably connected to the generator 3 and the counter gear mechanism 4. The rotor shaft 30 of the generator 3 connects to a sun gear 62 of the planetary gear set 6. The generator 3 is thus drivably connected to the engine 1 and the counter gear mechanism 4. A ring gear 63 of the planetary gear set 6 is connected to a second counter drive gear 12 through an output shaft 11. The second counter drive gear 12 is integrally formed with or fixed to the output shaft 11.

The motor 2 is drivably connected to the counter gear mechanism 4 through a first counter drive gear 23. The first counter drive gear 23 is integrally formed with or fixed to a rotor shaft 20 of the motor 2 or a motor shaft 22 connected to the rotor shaft 20.

The counter gear mechanism 4 comprises a counter shaft 40, a counter driven gear 41 integrally formed with or fixed to the counter shaft 40, and a differential drive pinion gear 42. The second counter drive gear 12 on the output shaft 11 and the first counter drive gear 23 on the motor shaft 22 are meshed with the counter driven gear 41. The counter gear mechanism 4 is thus drivably connected to the output shaft 11 and the motor shaft 22. Therefore, in this embodiment, the first counter driven gear to be paired up with the first counter drive gear 23 and the second counter driven gear to be paired up with the second counter drive gear 12 are integrally formed with each other.

The differential device 5 allows the differential drive pinion gear 42 of the counter shaft 40 to mesh with a differential gear 51 fixed to a differential case 50 of the differential device 5, and is drivably connected to the counter gear mechanism 4. The differential device 5 is connected to wheels (not shown) in a known manner.

In the hybrid driving apparatus having the above structure, the motor 2 and the wheels are directly connected in terms of power transmission, although they are in a speed-reduction relation of gear ratio of the pair of gears through the counter gear mechanism 4. However, the engine 1 and the generator 3 are indirectly connected to each other and connected to the counter gear mechanism 4 through the planetary gear set 6 in terms of the power transmission. With this arrangement, by adjusting the electric power generating load of the generator 3 with respect to the ring gear 63 which receives a running load of the vehicle through the differential device 5 and the counter gear mechanism 4, it becomes possible for the vehicle to run while appropriately adjusting a rate of engine output used for driving force and electric power generating energy (battery charging). If the generator 3 is driven as a motor, a reaction force applied to the carrier 61 is reversed. Therefore, if the carrier 61 is locked to a driving apparatus casing by appropriate means (not shown), the output of the generator 3 can be transmitted to the ring gear 63, and it becomes possible to increase the driving force at the vehicle start (to run in a parallel mode) by simultaneous outputs of the motor 2 and the generator 3.

Figure 2:
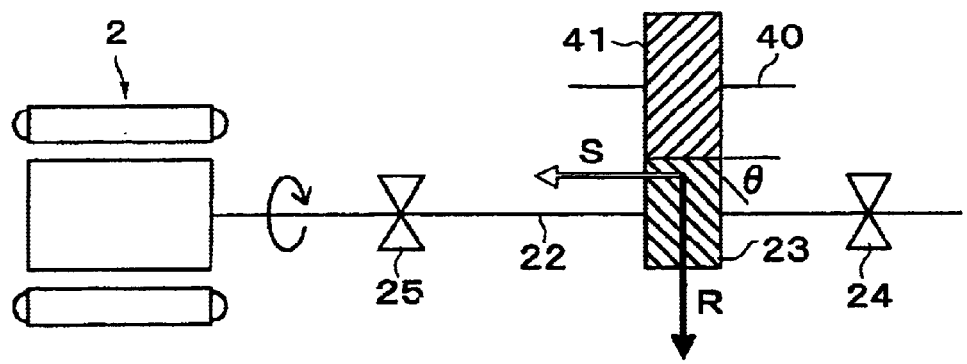
FIG. 2 is a schematic view of a support structure of an electric motor shaft of the driving apparatus of the first embodiment.

As schematically shown in FIG. 2, the motor 2, the motor shaft 22 connected to the motor 2, and having opposite sides supported by first and second shaft support means 24, 25, and a first counter drive gear 23, which comprises a helical gear provided on the motor shaft 22 between the first and second shaft support means 24, 25 and which meshes with the first counter driven gear 41, are disposed on the side of the motor shaft 22. The output of the motor 2 is transmitted to the wheels through the first counter drive gear 23 and the first counter driven gear 41 as described above. The invention is characterized in that the first counter drive gear 23 is disposed at a position closer to one of (closer to the first shaft support means 24 in this embodiment) the first and second shaft support means 24, 25, and a helix angle θ is set such that a thrust force S acts in a direction of the other shaft means 25. This helix direction is rightward when a rotation direction of the motor 2 is clockwise direction as viewed from the counter drive gear 23 as shown in the drawing.

Figure 3:
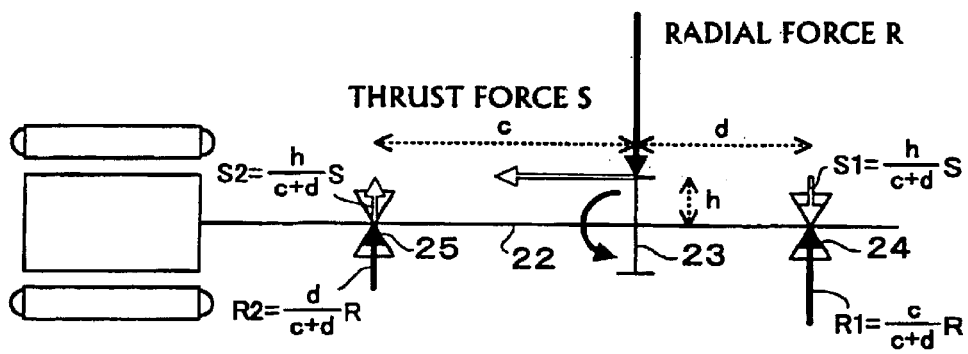
FIG. 3 is a schematic view showing a load applied to the support structure of the electric motor shaft of the first embodiment.

FIG. 3 schematically shows a load applied to the first and second shaft support means 24, 25. As shown in FIG. 3, a radial force R, shown with thick arrows, as a reaction force generated by meshing with the counter driven gear 41 and a thrust force S, shown with hollow arrows generated because the gear is the helical gear, act on the first counter drive gear 23. The helix angle of the first counter drive gear 23 is set in a direction in which a reaction forces of moment load S1 and a radial force reaction force R1 caused by the thrust force in the shaft support means 24 cancel each other, such that the thick arrows and the hollow arrows showing the reaction forces are opposed to each other.

The above-mentioned reaction forces will be described specifically. Where a distance from the first counter drive gear 23 to the first shaft support means 24 is d and a distance from the first counter drive gear 23 to the second shaft support means 25 is c, the reaction force of radial force R1 applied to the first shaft support means 24 is expressed as $R1=Rc/(c+d)$, and a reaction force of radial force R2 is expressed as $R2=Rd/(c+d)$. Where a meshing diameter of the first counter drive gear 23 is h, the reaction forces of moment load S1 and S2 applied to the first and second shaft support means 24, 25 respectively by the thrust force S are expressed as $S1=S2=Sh/(c+d)$. Therefore, preferably, it is effective to set the distances c, d so as to satisfy $\{Rd/(c+d)\}+\{Sh/(c+d)\}=\{Rc/(c+d)\}-\{Sh/(c+d)\}$, i.e., $c-d=2hS/R$ while assuming that the drawing is viewed downward so that the position of the first counter drive gear 23 between the first and second shaft support means 24, 25 is set such that the resultant, which is applied to the first shaft support means 24, of the reaction force R1 of radial force and reaction force S1 of moment load by the thrust force S is equal to the resultant, which is applied to the second shaft support means 25, of the reaction force R2 of radial force and reaction force S2 of moment load by the thrust force S.

A similar technical idea is applied also to the support mechanism on the side of the output shaft. In this case, as shown in FIG. 1, the output shaft 11, drivably connected to the engine 1, is supported by third and fourth shaft support means 13, 14. The second counter drive gear 12 comprising the helical gear which meshes with a second counter driven gear 41 is provided on the output shaft 11 outside with respect to the third and fourth shaft support means 13, 14. Output of the engine 1 is transmitted to the wheels through the second counter drive gear 12 and the second counter driven gear 41. A helix angle of the second counter drive gear 12 is set such that a thrust force acts on the third and fourth shaft support means 13, and 14. More specifically, the planetary gear set 6 is disposed between the engine 1 and the second counter drive gear 12 in power transmission and comprises a combination of helical gears. The planetary gear set 6 is constituted such that the ring gear 63 as one element of the planetary gear set 6 rotates integrally with output shaft 11. The ring gear 63 and the second counter drive gear 12 are set such that the helix angles thereof are in directions canceling the thrust forces (shown with the hollow arrows in the drawing) from each other.

Figure 4:
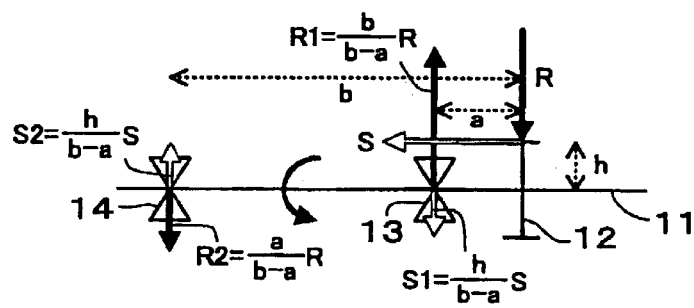
FIG. 4 is a schematic view showing a load applied to a support structure of an output shaft of the first embodiment.

FIG. 4 schematically shows loads applied to the second and third shaft support means 13, 14. As shown in FIG. 4, the radial force R, shown with thick arrows, as a reaction force generated by meshing with the counter driven gear 41 and the thrust force S, shown with hollow arrows generated because the gear is a helical gear, act on the second counter drive gear 12. The helix angle of the second counter drive gear 12 is set in a direction in which the reaction forces of moment load S1 caused by the thrust force S in the shaft support means 13 and the reaction force of radial force R1 cancel each other, i.e., the thick arrows and the hollow arrows showing the reaction forces are directed in opposite directions. In this case, where a distance from the second counter drive gear 12 to the third shaft support means 13 is a and a distance from the second counter drive gear 12 to the fourth shaft support means 14 is b, the reaction force of radial force R1 applied to the third shaft support means 13 is expressed as $R1=Rb/(b-a)$ and the reaction force of radial force R2 applied to the fourth shaft support means 14 is expressed as $R2=Ra/(b-a)$. Further, if a meshing diameter of the second counter drive gear 12 is h, the reaction forces of moment load S1 and S2 applied to the third and fourth shaft support means 13, 14 respectively by the thrust force S are expressed as $S1=S2=Sh/(b-a)$. Therefore, preferably, it is effective to set the distances a and b so as to satisfy $\{Sh/(b-a)\}-\{Ra/(b-a)\}=\{Rb/(b-a)\}-\{Sh/(b-a)\}$, i.e., $a+b=2hS/R$ while assuming that the drawing is viewed downward so that the position of the second counter drive gear 12 with respect to the third and fourth shaft support means 13, 14 is set such that the resultant, which is applied to the third shaft support means 13, of the reaction force R1 of radial force and reaction force S1 of moment load by the thrust force is equal to the resultant, which is applied to the fourth shaft support means 14, of the reaction force R2 of radial force and reaction force S2 of moment load by the thrust force.

Figure 5:
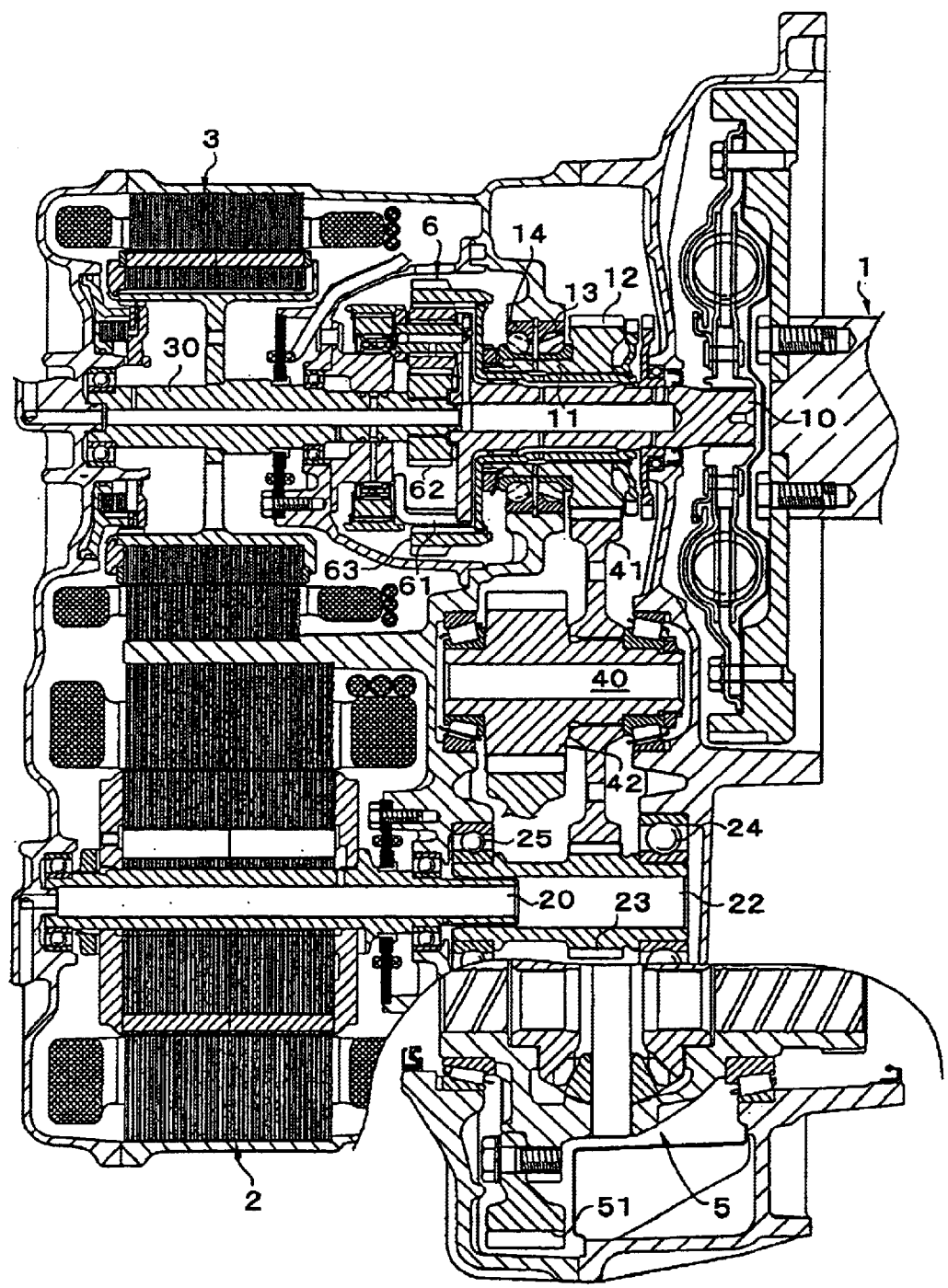
FIG. 5 is a sectional view showing a specific example of the driving apparatus of the first embodiment.

FIG. 5 is a sectional view of a further specific example of the hybrid driving apparatus employing the above structure. In this example, ball bearings are used as the first and second shaft support means 24, 25 on the side of the motor shaft 22. Although the ball bearing is more disadvantageous than a roller bearing in terms of supporting force with a bearing size taken into account, it is more advantageous than the roller bearing in terms of drag loss. Angular ball bearings are used as the third and fourth shaft support means 13, 14 on the side of the output shaft 11. Constituent elements in this example are designated with the same reference symbols as those used in the embodiment as described above, and explanation thereof is omitted.

Figure 6:
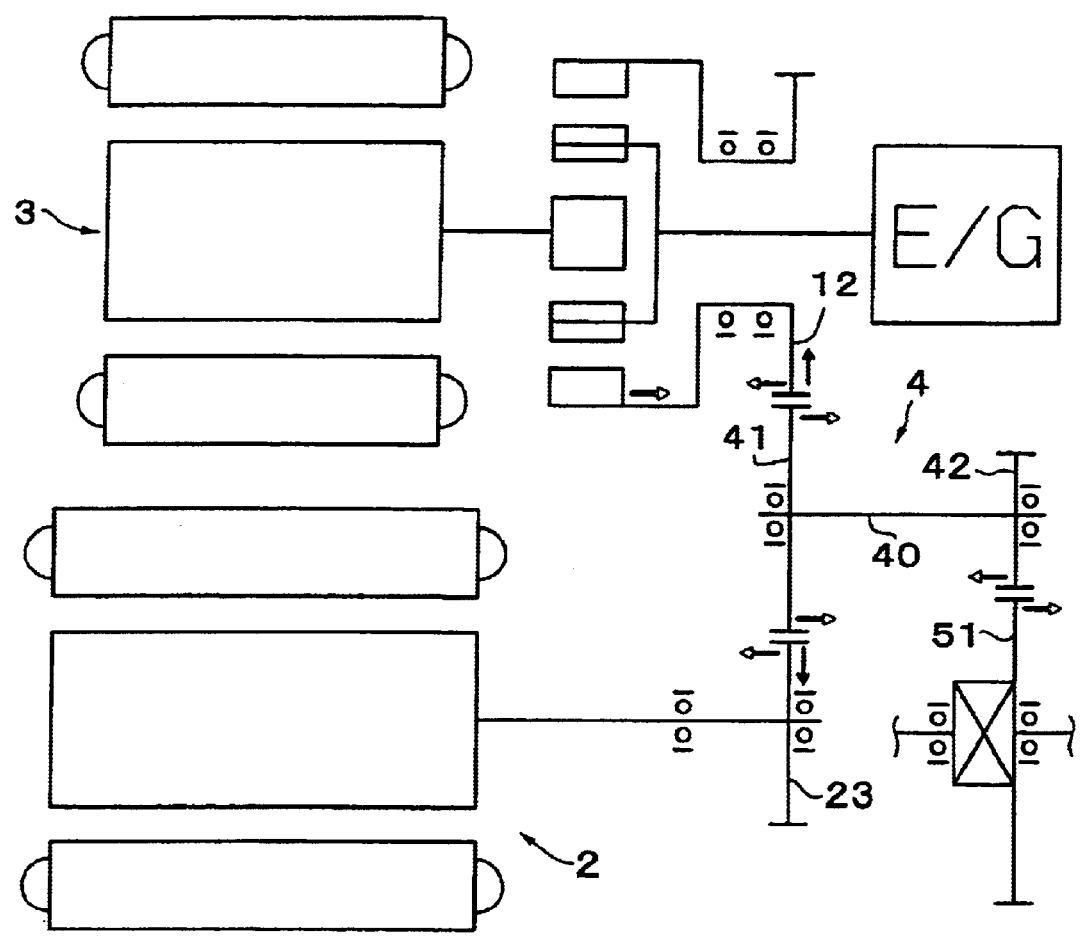
FIG. 6 is a skeleton diagram of a hybrid driving apparatus according to a second embodiment of the invention.

FIG. 6 is a skeleton diagram of a hybrid driving apparatus according to the second embodiment of the invention in which the counter gear mechanism 4 and the second and first counter drive gears 12, 23 with respect to the counter gear mechanism 4 of the first embodiment are changed in terms of position. In this embodiment, the counter driven gear 41 is disposed at a position close to the motor 2 of the counter shaft 40 of the counter gear mechanism 4, and the differential drive pinion gear 42 is disposed on the opposite side. In correspondence to this layout, the first and second counter drive gears 23, 12 are disposed at positions close to the motor 2 and the generator 3 and the differential gear 51 is disposed on the opposite side thereof. The remaining structure is entirely the same as that of the first embodiment.

Figure 7:
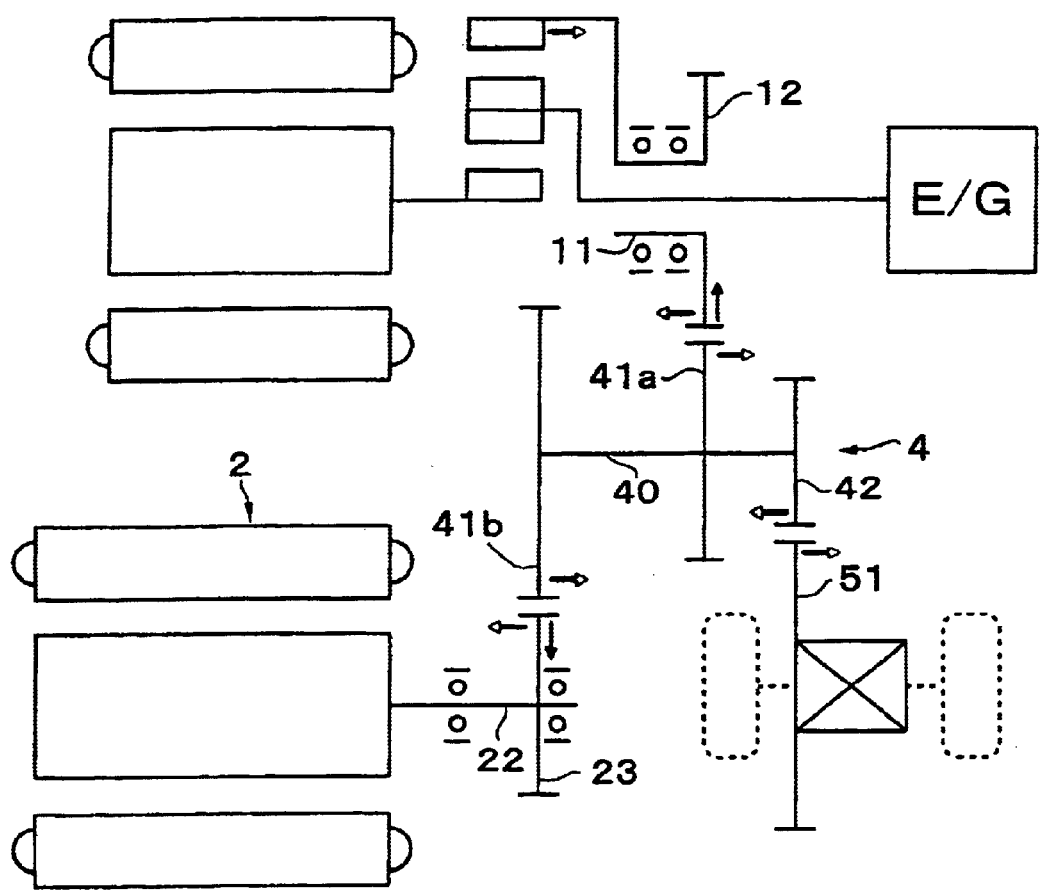
FIG. 7 is a skeleton diagram of a hybrid driving apparatus according to a third embodiment of the invention.

FIG. 7 is a skeleton diagram of a hybrid driving apparatus according to the third embodiment of the invention in which the counter driven gears are formed as separate members in the same layout of the counter gear mechanism 4 as that of the second embodiment. In this embodiment, a first counter driven gear 41b is disposed at a position close to the motor 2 of the counter shaft 40 of the counter gear mechanism 4, a second counter driven gear 41a is disposed at an intermediate portion of the counter shaft 40, and the differential drive pinion gear 42 is disposed at a position of greater distance from the motor of countershaft 40 that the second counter driven gear 41a. In correspondence to this layout, the first counter drive gear 23 on the side of the motor shaft 22 is disposed at a position closest to the motor 2, and the second counter drive gear 12 on the side of the output shaft 11 is disposed at a position closer to the engine with respect to the first counter drive gear 23. The remaining structure is entirely the same as that of the second embodiment.

Figure 8:
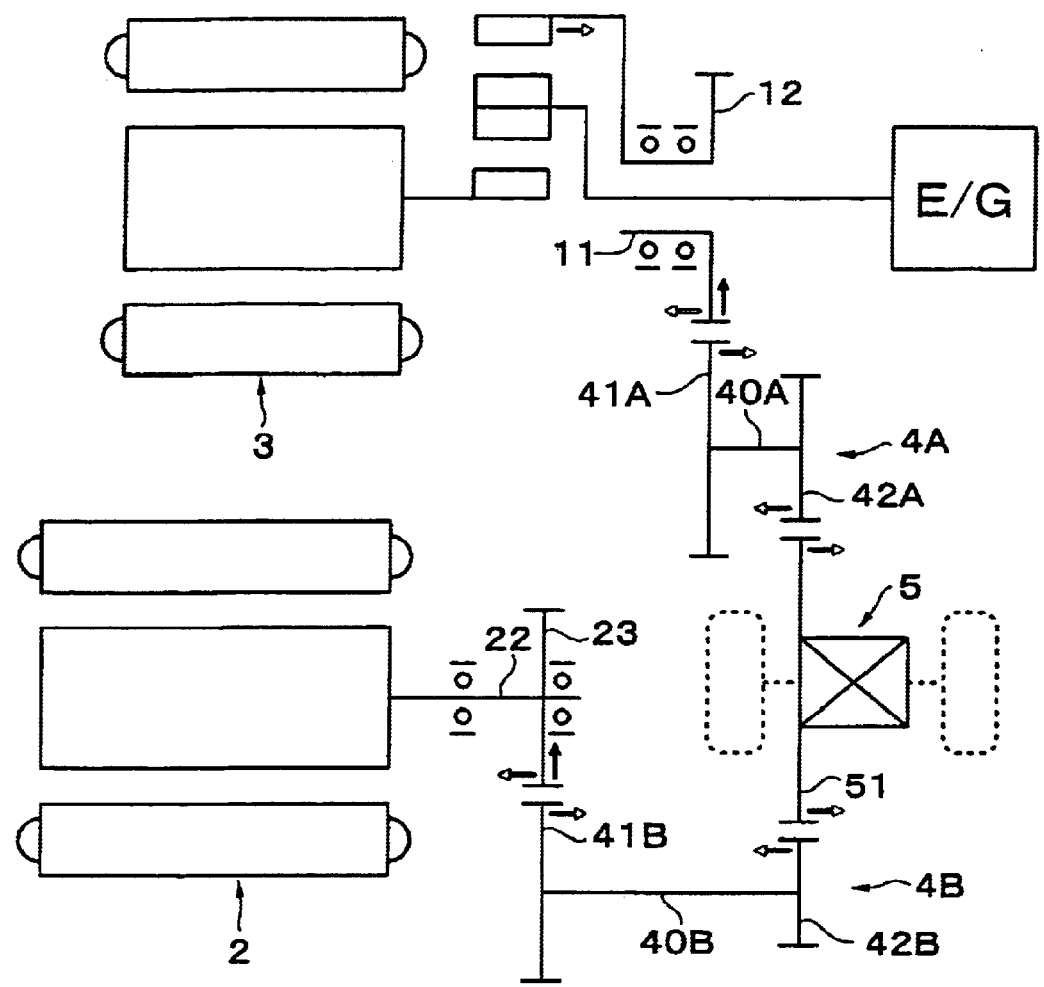
FIG. 8 is a skeleton diagram of a hybrid driving apparatus according to a fourth embodiment of the invention.

FIG. 8 is a skeleton diagram of a hybrid driving apparatus according to the fourth embodiment of the invention in which counter gear mechanisms 4A, 4B are separately provided on the side of the output shaft 11 and on the side of the motor shaft 22. In this embodiment, a first counter driven gear 41 B is disposed at a position close to the motor 2 in a counter shaft 40B of a first counter gear mechanism 4B, and a first differential drive pinion gear 42B is disposed at a position close to the differential device 5. Further, a second counter driven gear 41A is disposed at a position close to the generator 3 of the counter shaft 40A of a second counter gear mechanism 4A, and a second differential drive pinion gear 42A is disposed at a position closer to the differential device 5. In this layout, the first counter drive gear 23 is disposed on the side of the motor shaft 22, and the second counter drive gear 12 is similarly disposed on the side of the output shaft 11. The remaining structure is entirely the same as that of each of the above embodiments.

Figure 9:
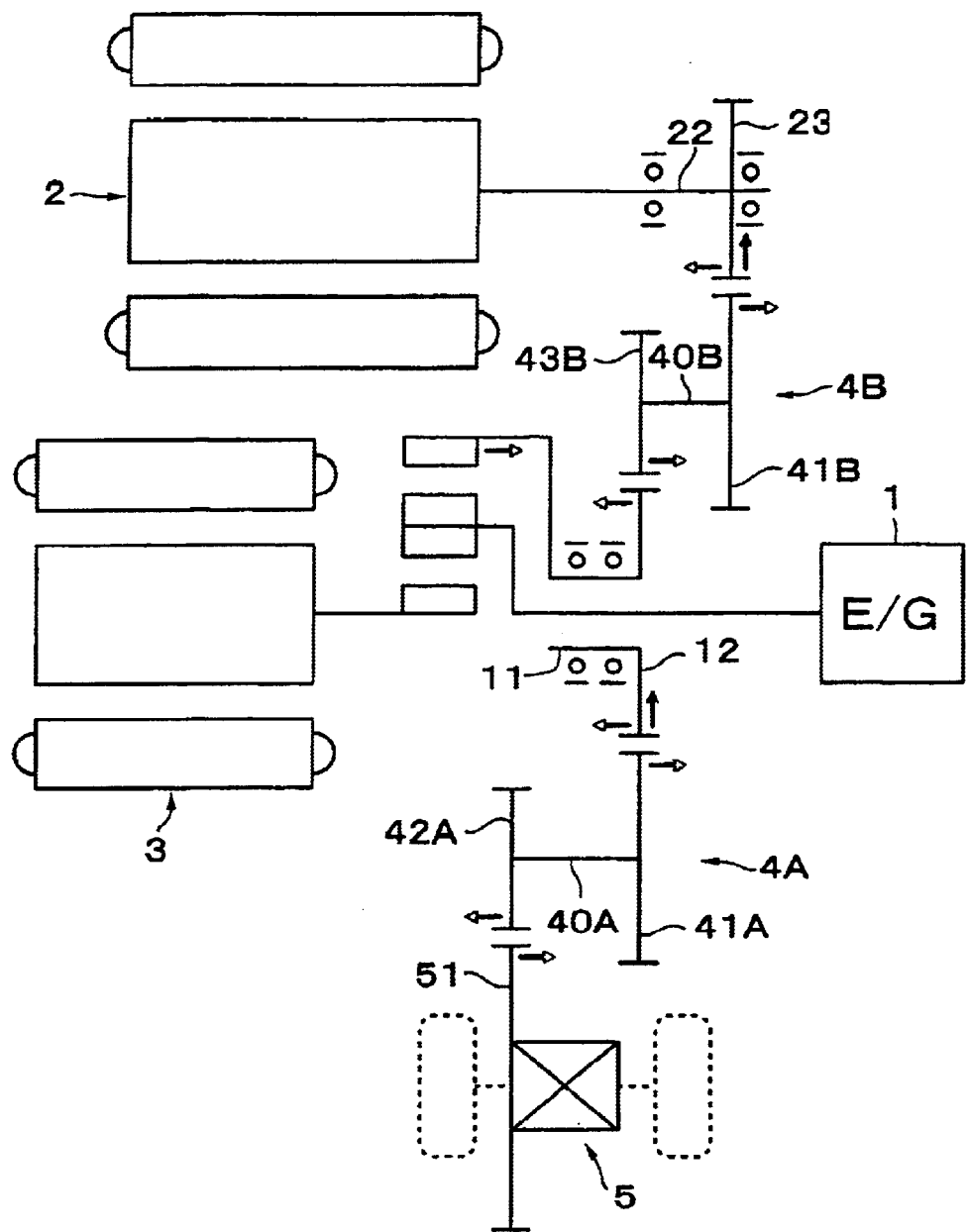
FIG. 9 is a skeleton diagram of a hybrid driving apparatus according to a fifth embodiment of the invention.

FIG. 9 is a skeleton diagram of a hybrid driving apparatus according to the fifth embodiment of the invention in which output of the motor is transmitted to the differential device 5 through the output shaft 11. In this embodiment, the first counter gear mechanism 4B is disposed between the motor shaft 22 and the output shaft 11, and a second counter gear mechanism 4A is disposed between the output shaft 11 and the differential shaft. The first counter driven gear 41 B is disposed at a position farther from the motor 2 on the first counter shaft 40B, and a pinion gear 43B which meshes with the second counter drive gear 12 to drive the drive gear 12 as a driven gear is disposed at a position close to the motor 2. In the counter shaft 40A of the second counter gear mechanism 4A, the second counter driven gear 41A is disposed at a position close to the engine, and a differential drive pinion gear 42A is disposed at a position close to the differential device 5. In this layout, the first counter drive gear 23 on the side of the motor shaft 22 and the second counter drive gear 12 on the side of the output shaft 11 are disposed. The remaining structure is entirely the same as that of each of the above embodiments.

Figure 10:
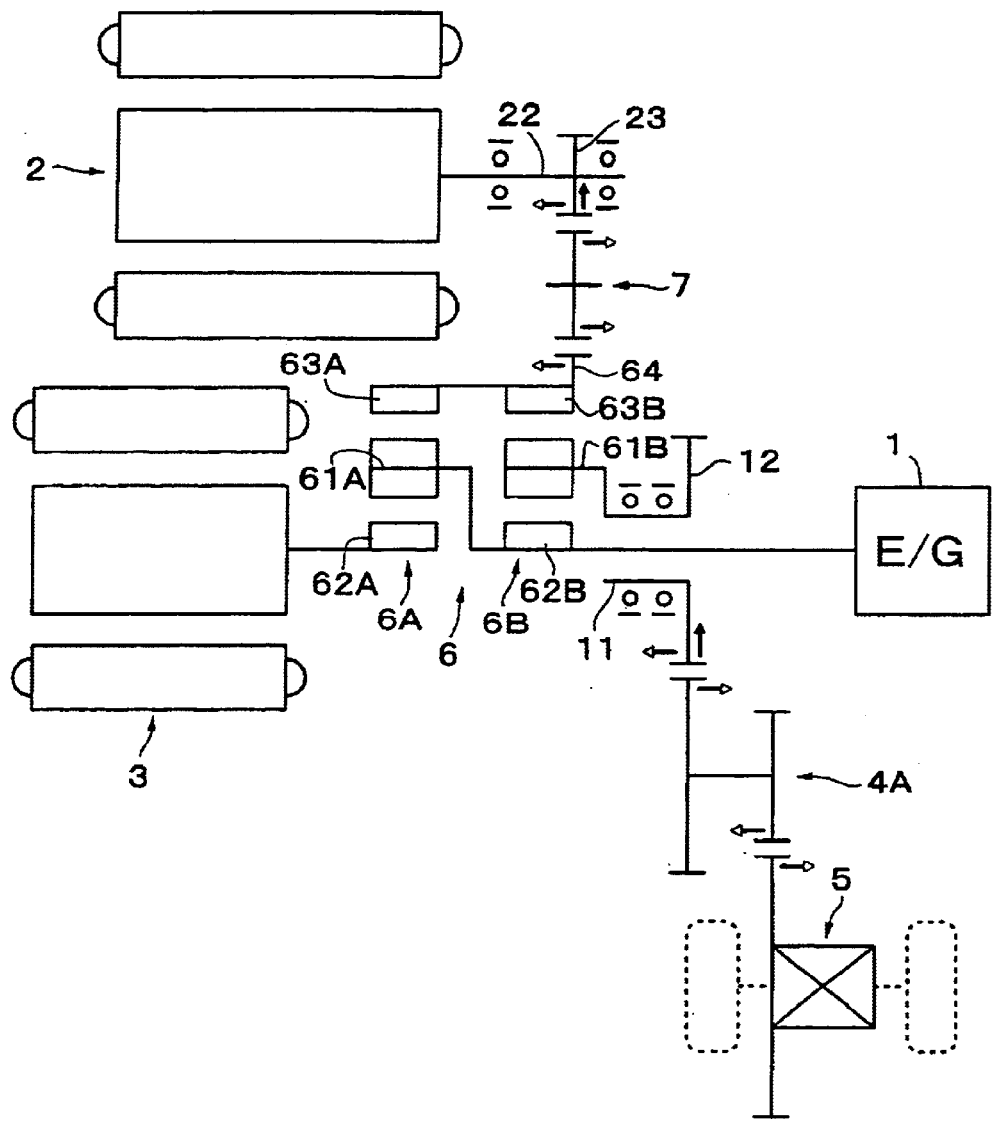
FIG. 10 is a skeleton diagram of a hybrid driving apparatus according to a sixth embodiment of the invention.

FIG. 10 is a skeleton diagram of a hybrid driving apparatus according to the sixth embodiment of the invention in which output of the motor is transmitted to the differential device 5 through the planetary gear set 6 and the output shaft 11 as in the fifth embodiment. In this embodiment, unlike the above embodiments, the planetary gear set 6 comprises two simple planetary gear sets 6A and 6B, ring gears 63A and 63B thereof are connected to each other, and a carrier 61A of the planetary gear set and a sun gear 62B of the other planetary gear set are connected to each other. In this case, the sun gear 62A of the planetary gear set is connected to the generator 3, the carrier 61A of the planetary gear set and the sun gear 62B of the other planetary gear set which are connected to each other are connected to the engine 1, and a carrier 61B of the other planetary gear set is connected to the second counter drive gear 12 through the output shaft 11. An idler gear 7 is disposed between the motor shaft 22 and the planetary gear set 6. The idler gear 7 is drivably connected to the first counter drive gear 23 of the motor shaft 22 and a gear 64 fixed to the ring gears 63A, 63B of the planetary gear set 6 by meshing thereto. The relationship between the second counter gear mechanism 4A and the differential device 5 is the same as that of the fourth embodiment shown in FIG. 8, and the remaining structure is entirely the same as that of each of the above embodiments.

Figure 11:
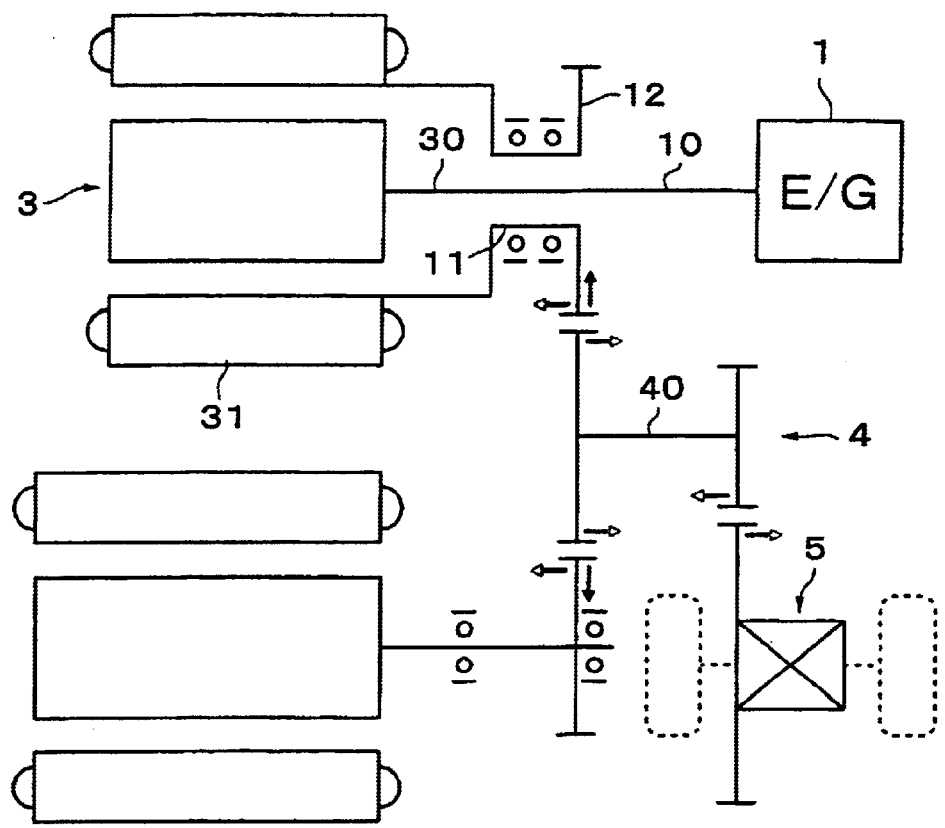
FIG. 11 is a skeleton diagram of a hybrid driving apparatus according to a seventh embodiment of the invention.

FIG. 11 is a skeleton diagram of a hybrid driving apparatus according to the seventh embodiment of the invention in which the planetary gear set is removed from the structure of the second embodiment shown in FIG. 6. In this embodiment, as a substitute structure of the planetary gear set 6, the output shaft 10 of the engine 1 and the rotor shaft 30 of the generator 3 are directly connected, the generator 3 is rotatably supported on the side of a stator 31 with respect to a casing and is directly connected to the second counter drive gear 12 through the output shaft 11 of the engine. In the case of this embodiment, a structure after the counter gear mechanism is not limited to this, and any structures of the above embodiments may be employed.

In this embodiment, the motor 2 and the wheels are directly connected to each other in terms of power transmission, but the engine 1 and the generator 3 are indirectly connected to each other and to the counter gear mechanism 4 through the stator 31 in terms of power transmission. Therefore, in this embodiment also, by adjusting the electric power generating load of the generator 3 with respect to the stator 31 which receives a running load of the vehicle through the differential device 5 and the counter gear mechanism 4, it becomes possible for the vehicle to run while appropriately adjusting a rate of engine output used for driving force and electric power generating energy (battery charging). If the generator 3 is driven as an outer rotor motor, the second counter drive gear 12 can be driven, and it becomes possible to increase the driving force at the vehicle start (to run in a parallel mode) by simultaneous outputs of the motor 2 and the generator 3.

Figure 12:
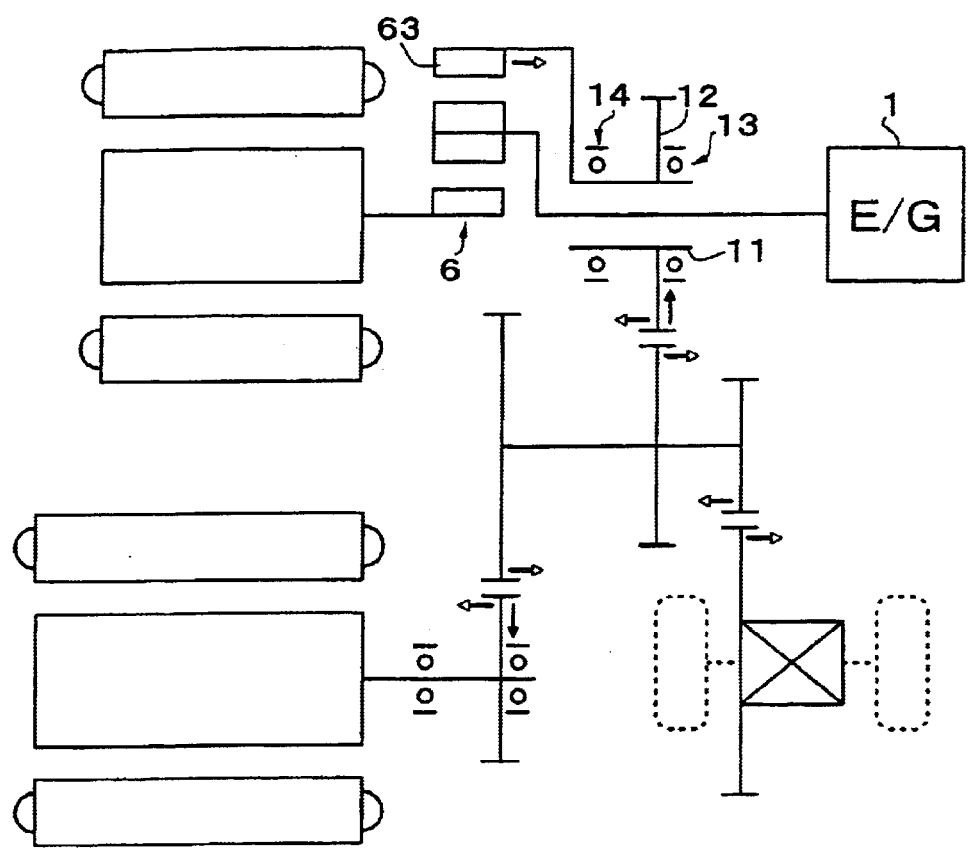
FIG. 12 is a skeleton diagram of a hybrid driving apparatus according to an eighth embodiment of the invention.
Figure 13:
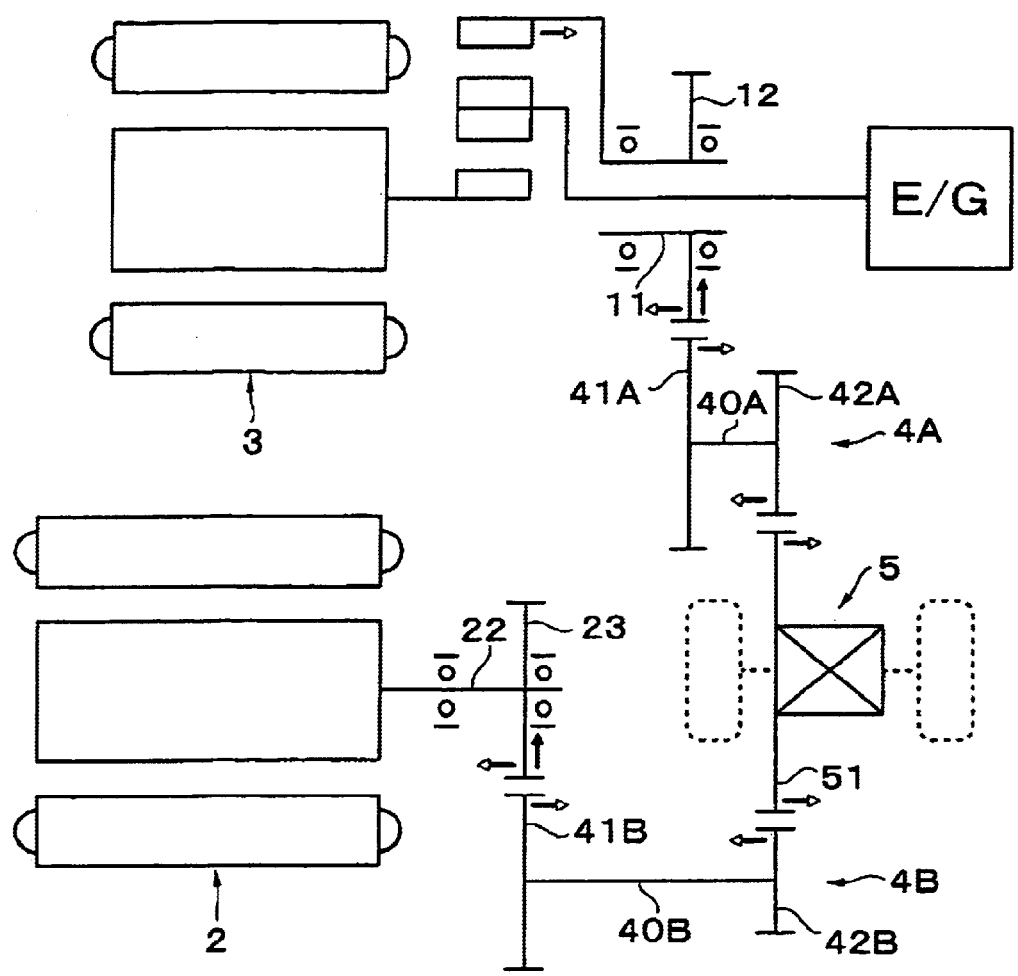
FIG. 13 is a skeleton diagram of a hybrid driving apparatus according to a ninth embodiment of the invention.
Figure 14:
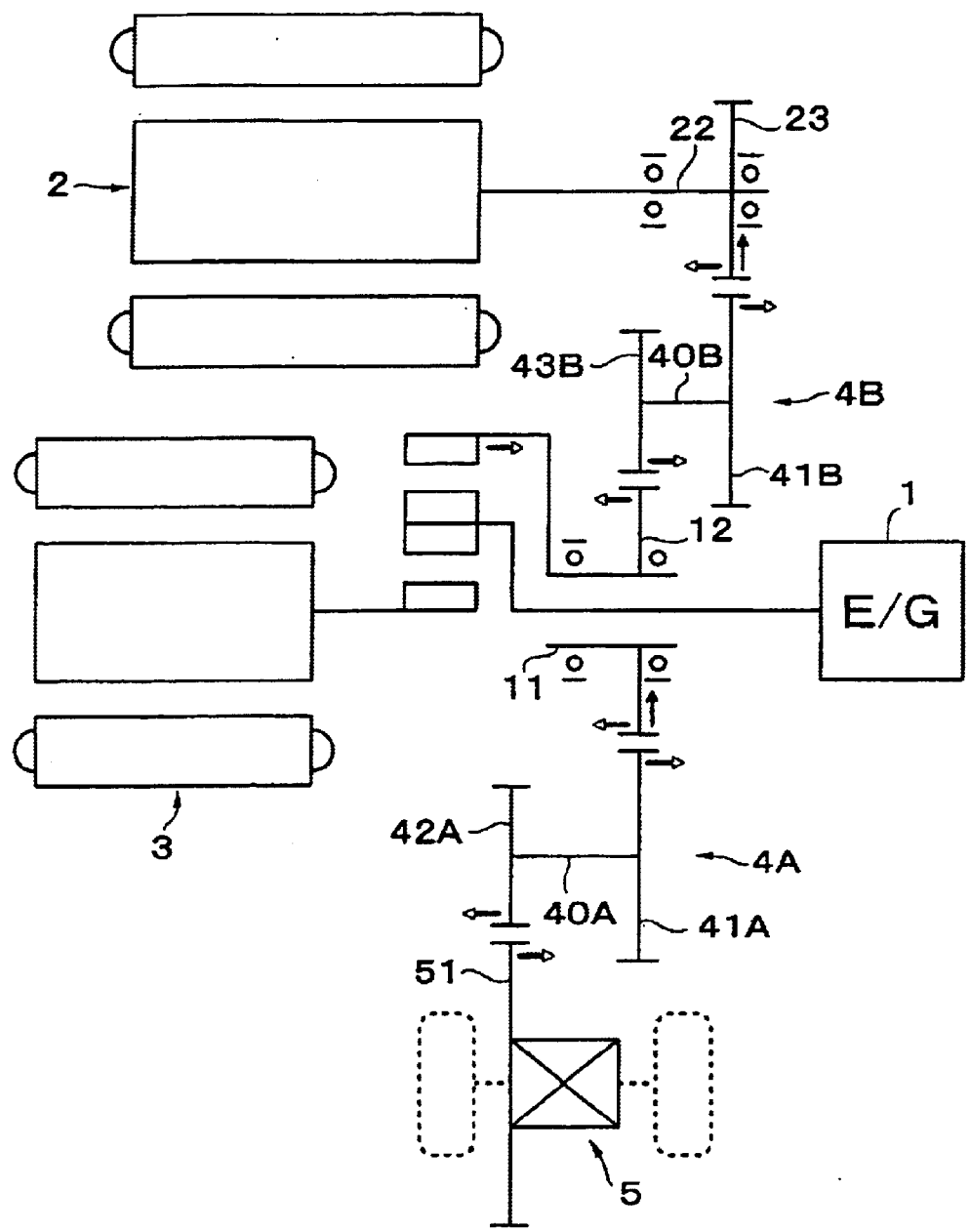
FIG. 14 is a skeleton diagram of a hybrid driving apparatus according to a tenth embodiment of the invention.
Figure 15:
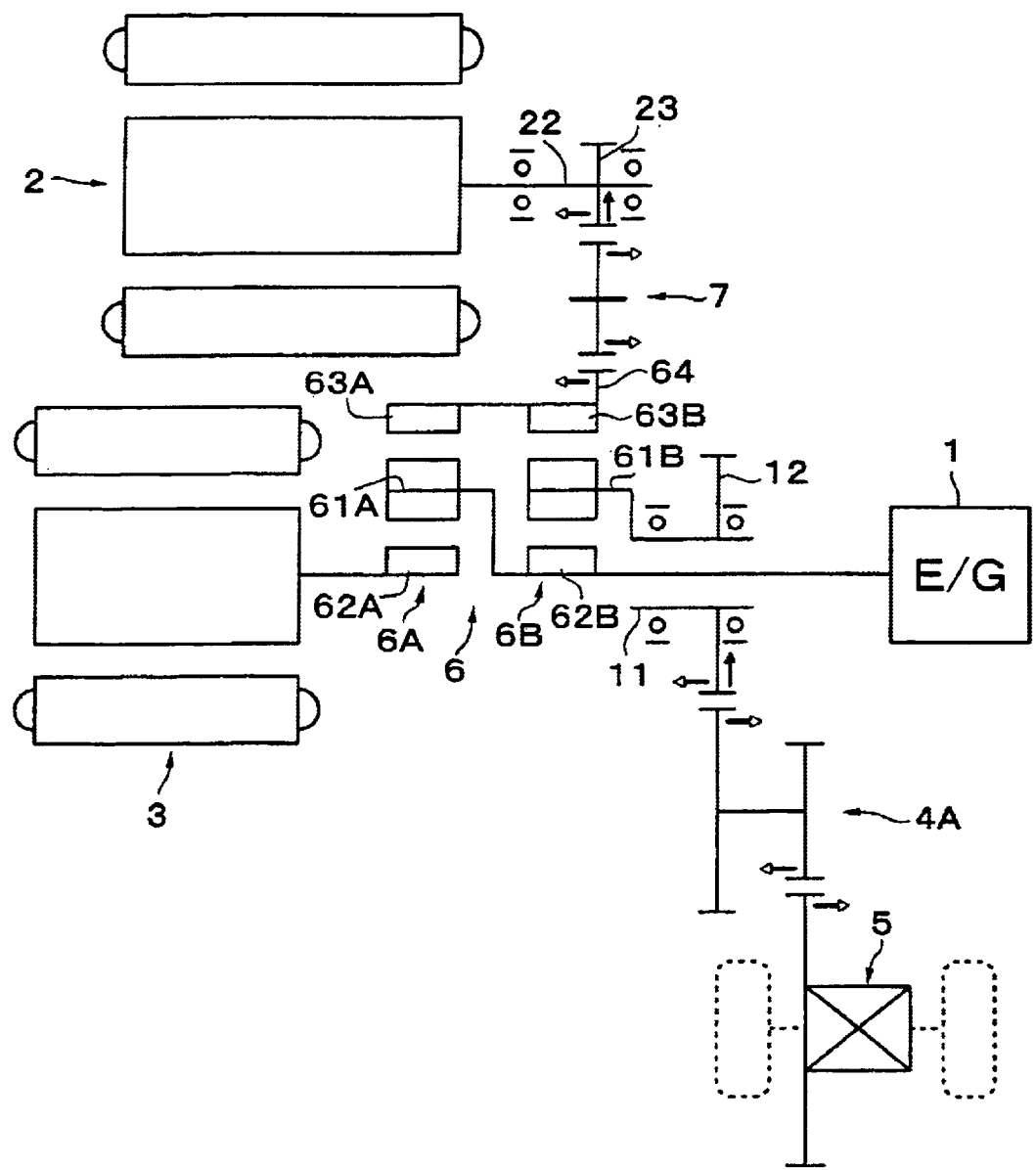
FIG. 15 is a skeleton diagram of a hybrid driving apparatus according to an eleventh embodiment of the invention.
Figure 16:
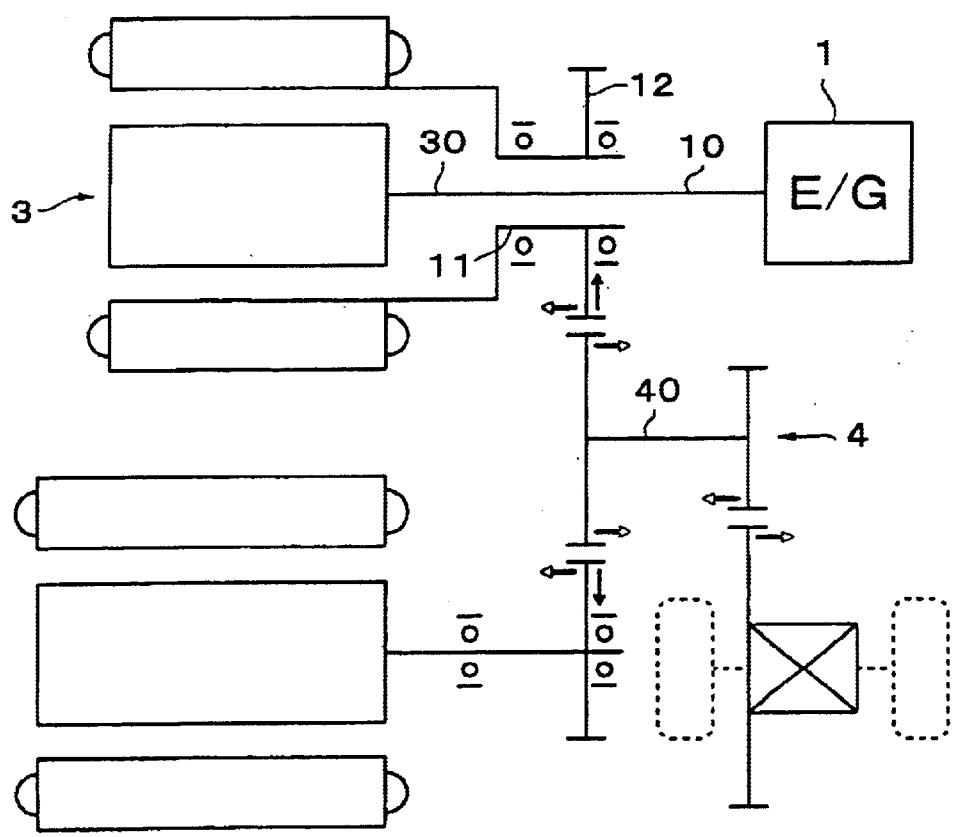
FIG. 16 is a skeleton diagram of a hybrid driving apparatus according to a twelfth embodiment of the invention.

Although the motor shaft 22 is supported on both sides with respect to the load applied to the gear, and the output shaft 11 is supported on one side (cantilever manner) in any of the above embodiments; both shafts can also be supported on both sides. An embodiment employing such a structure will be explained below. FIG. 12 is a skeleton diagram of a hybrid driving apparatus according to the eighth embodiment of the invention in which only the shaft support structure on the side of the output shaft 11 is changed in the same structure as that of the third embodiment shown in FIG. 7. In this embodiment, the third and fourth shaft support means 13, 14 which support the second counter drive gear 12 on one side in a cantilever manner are distributed and disposed on opposite sides of the second counter drive gear 12 for supporting it on both sides. In this case also, the second counter drive gear 12 is disposed at a position close to one of the third and fourth shaft support means 13, 14, and the helix angle is set in a direction in which the thrust force acts in a direction of the other third and fourth shaft support means 13, 14. Further, in this case, the planetary gear set 6 disposed between the engine 1 and the second counter drive gear 12 in terms of the driving connection comprises a combination of helical gears, and its ring gear (one element) 63 rotates integrally with the output shaft 11. Twist angles of the ring gear (one element) 63 of the planetary gear set 6 and the second counter drive gear 12 are set in directions to cancel the thrust forces with each other.

The ninth to twelfth embodiments shown in FIGS. 13 to 16 correspond to the embodiments shown in FIGS. 8 to 11, respectively, and the difference between the embodiments lie only in the supporting structure of the output shaft 11 which supports the second counter drive gear 12 on both sides in the above embodiments. Therefore, constituent elements in the ninth to twelfth embodiments are designated with the same reference symbols as those used in the embodiments as described above, and explanation thereof is omitted.

The invention has been explained based on the various embodiments in which the counter gear mechanism is mainly changed, but the invention is not limited to these embodiments, and the invention can variously be changed and carried out within a range described in claims.

What is claimed is:

1. A driving apparatus comprising:
an electric motor;
an electric motor shaft connected to the electric motor and supported by first and second shaft support means;
a first counter drive gear comprising a helical gear provided on the electric motor shaft between the first and second shaft support means;
a first counter driven gear to be meshed with the first counter drive gear, in which an output of the electric motor is transmitted to wheels through the first counter drive gear and the first counter driven gear, wherein the first counter drive gear is disposed at a position closer to one of the first and second shaft support means, and a helix angle of the first counter drive gear is set in a direction in which a thrust force acts toward the other shaft support means;
an engine;
an output shaft drivably connected to the engine and supported by third and fourth shaft support means;
a second counter drive gear comprising a helical gear provided on the output shaft outside with respect to the third and fourth shaft support means;
a second counter driven gear to be meshed with the second counter drive gear;
a system for transmitting output of the engine to the wheels through the second counter drive gear and the second counter driven gear, wherein a helix angle of the second counter drive gear is set in a direction in which a thrust force acts toward the third and fourth shaft support means; and
a planetary gear set which is disposed between the engine and the second counter drive gear in terms of power transmission and comprises a combination of helical gears, one element of the planetary gear set rotating integrally with the output shaft, wherein helix angles of the one element of the planetary gear set and the second counter drive gear are set in directions to cancel thrust forces with each other.

2. The driving apparatus according to claim 1, wherein the electric motor is disposed at the side of the second shaft support means, the first counter drive gear is disposed at a position closer to the first shaft support means, and the helix angle of the first counter drive gear is set in a direction in which the thrust force acts towards the second shaft support means.

3. The driving apparatus according to claim 1, wherein a position of the second counter drive gear is set such that a first resultant, which is applied to the third shaft support means, of the reaction force of radial force and reaction force of moment by the thrust force is equal to a second resultant, which is applied to the fourth shaft support means, of the reaction force of radial force and reaction force of moment load by the thrust force.

4. The driving apparatus according to claim 1, wherein the driving apparatus is mounted in a vehicle and a relationship between the helix angle of the second counter drive gear and a direction in which the thrust force acts is set to be that for when the vehicle is in a power running state.

5. The driving apparatus according to claim 1, wherein the first counter driven gear and the second counter driven gear are the same member.

6. The driving apparatus according to claim 1, wherein the electric motor is disposed at the side of the second shaft support means, the first counter drive gear is disposed at a position closer to the first shaft support means, the helix angle of the first counter drive gear is set in a direction in which a reaction force of moment load caused by the thrust force and a reaction force of radial force offset each other in the first shaft support means, the driving apparatus is mounted in a vehicle, and a relationship between the helix angle of the first counter drive gear and the direction in which the thrust force acts is set to be that for when the vehicle is in a power running state.

7. The driving apparatus according to claim 1, wherein the electric motor and the first counter drive gear rotate at a same speed.

8. A driving apparatus comprising:
an electric motor;
an electric motor shaft connected to the electric motor and supported by first and second shaft support means;
a first counter drive gear comprising a helical gear provided on the electric motor shaft between the first and second shaft support means; and
a first counter driven gear to be meshed with the first counter drive gear, in which an output of the electric motor is transmitted to wheels through the first counter drive gear and the first counter driven gear, wherein the first counter drive gear is disposed at a position closer to the first shaft support means, and a helix angle of the first counter drive gear is set in a direction in which a reaction force of moment load caused by a thrust force and a reaction force of radial force offset each other in the first shaft support means;
wherein a position of the first counter drive gear between the first and second shaft support means is set such that a first resultant, which is applied to the first shaft support means, of the reaction force of radial force and reaction force of moment load by the thrust force is equal to a second resultant, which is applied to the second shaft support means, of the reaction force of radial force and reaction force of moment load by the thrust force;
an engine;
an output shaft drivably connected to the engine and supported by third and fourth shaft support means;
a second counter drive gear comprising a helical gear provided on the output shaft and to one side of the third and fourth shaft support means;
a second counter driven gear to be meshed with the second counter drive gear;
a system for transmitting output of the engine to the wheels through the second counter drive gear and the second counter driven gear, wherein a helix angle of the second counter drive gear is set in a direction in which a thrust force acts toward the third and fourth shaft support means; and
a planetary gear set which is disposed between the engine and the second counter drive gear in terms of power transmission and comprises a combination of helical gears, one element of the planetary gear set rotating integrally with the output shaft, wherein helix angles of the one element of the planetary gear set and the second counter drive gear are set in directions to cancel thrust forces with each other.

9. The driving apparatus according to claim 8, wherein the electric motor is disposed at the side of the second shaft support means, and the helix angle of the first counter drive gear is set in a direction in which the thrust force acts towards the second shaft support means.

10. The driving apparatus according to claim 8, wherein a position of the second counter drive gear is set such that a first resultant, which is applied to the third shaft support means, of the reaction force of radial force and reaction force of moment by the thrust force is equal to a second resultant, which is applied to the fourth shaft support means, of the reaction force of radial force and reaction force of moment load by the thrust force.

11. The driving apparatus according to claim 8, wherein the driving apparatus is mounted in a vehicle and a relationship between the helix angle of the second counter drive gear and a direction in which the thrust force acts is set to be that for when the vehicle is in a power running state.

12. The driving apparatus according to claim 8, wherein the first counter driven gear and the second counter driven gear are the same member.

13. The driving apparatus according to claim 8, wherein the electric motor is disposed at the side of the second shaft support means, the driving apparatus is mounted in a vehicle, and a relationship between the helix angle of the first counter drive gear and the direction in which the thrust force acts is set to be that for when the vehicle is in a power running state.

14. The driving apparatus according to claim 8, wherein the electric motor and the first counter drive gear rotate at a same speed.

15. A driving apparatus comprising:
an electric motor;
an electric motor shaft connected to the electric motor and supported by first and second shaft support means;
a first counter drive gear comprising a helical gear provided on the electric motor shaft between the first and second shaft support means;
a first counter driven gear to be meshed with the first counter drive gear, in which an output of the electric motor is transmitted to wheels through the first counter drive gear and the first counter driven gear, wherein the first counter drive gear is disposed at a position closer to the first shaft support means, and a helix angle of the first counter drive gear is set in a direction in which a reaction force of moment load caused by a thrust force and a reaction force of radial force offset each other in the first shaft support means;
an engine;
an output shaft drivably connected to the engine and supported by third and fourth shaft support means;
a second counter drive gear comprising a helical gear provided on the output shaft outside with respect to the third and fourth shaft support means;
a second counter driven gear to be meshed with the second counter drive gear;
a system for transmitting output of the engine to the wheels through the second counter drive gear and the second counter driven gear, wherein a helix angle of the second counter drive gear is set in a direction in which a thrust force acts toward the third and fourth shaft support means; and
a planetary gear set which is disposed between the engine and the second counter drive gear in the power transmission and comprises a combination of helical gears, one element of the planetary gear set rotating integrally with the output shaft, wherein helix angles of the one element of the planetary gear set and the second counter drive gear are set in directions to cancel thrust forces with each other.

16. The driving apparatus according to claim 15, wherein the electric motor is disposed at the side of the second shaft support means, and the helix angle of the first counter drive gear is set in a direction in which the thrust force acts towards the second shaft support means.

17. The driving apparatus according to claim 15, wherein a position of the second counter drive gear is set such that a first resultant, which is applied to the third shaft support means, of the reaction force of radial force and reaction force of moment by the thrust force is equal to a second resultant, which is applied to the fourth shaft support means, of the reaction force of radial force and reaction force of moment load by the thrust force.

18. The driving apparatus according to claim 15, wherein the driving apparatus is mounted in a vehicle and a relationship between the helix angle of the second counter drive gear and a direction in which the thrust force acts is set to be that for when the vehicle is in a power running state.

19. The driving apparatus according to claim 15, wherein the first counter driven gear and the second counter driven gear are the same member.

20. The driving apparatus according to claim 15, wherein the electric motor is disposed at the side of the second shaft support means, the driving apparatus is mounted in a vehicle, and a relationship between the helix angle of the first counter drive gear and the direction in which the thrust force acts is set to be that for when the vehicle is in a power running state.

21. The driving apparatus according to claim 15, wherein the electric motor and the first counter drive gear rotate at a same speed.

* * * * *